(12) United States Patent
Yamagishi et al.

(10) Patent No.: US 11,621,993 B2
(45) Date of Patent: Apr. 4, 2023

(54) INFORMATION PROCESSING DEVICE, INFORMATION PROCESSING METHOD, AND PROGRAM

(71) Applicant: Saturn Licensing LLC, New York, NY (US)

(72) Inventors: Yasuaki Yamagishi, Kanagawa (JP); Naohisa Kitazato, Tokyo (JP)

(73) Assignee: SATURN LICENSING LLC, New York, NY (US)

( * ) Notice: Subject to any disclaimer, the term of this patent is extended or adjusted under 35 U.S.C. 154(b) by 0 days.

(21) Appl. No.: 14/069,032

(22) Filed: Oct. 31, 2013

(65) Prior Publication Data

US 2014/0067922 A1    Mar. 6, 2014

Related U.S. Application Data

(63) Continuation of application No. 13/996,163, filed as application No. PCT/JP2012/052904 on Feb. 8, 2012, now abandoned.

(30) Foreign Application Priority Data

Feb. 15, 2011    (JP) .............................. JP2011-030058

(51) Int. Cl.
*G06F 15/16*    (2006.01)
*H04L 67/01*    (2022.01)
(Continued)

(52) U.S. Cl.
CPC .............. *H04L 67/01* (2022.05); *H04L 67/10* (2013.01); *H04N 21/4622* (2013.01); *H04N 21/8173* (2013.01); *H04N 21/8545* (2013.01)

(58) Field of Classification Search
CPC ......... H04L 65/60; H04L 67/00; H04L 67/36; H04L 69/00; H04L 67/42; H04L 67/10;
(Continued)

(56) References Cited

U.S. PATENT DOCUMENTS

| 2006/0089914 A1* | 4/2006 | Shiel ...................... G06Q 30/00 705/52 |
| 2007/0008909 A1* | 1/2007 | Tsusaka .............. H04L 12/2803 370/259 |

(Continued)

FOREIGN PATENT DOCUMENTS

| CN | 1848933 | 10/2006 |
| CN | 101742079 | 6/2010 |

(Continued)

OTHER PUBLICATIONS

The Extended European Search Report dated Oct. 22, 2014, in Application No. / Patent No. 12746987.2-1954 / 2677421.

(Continued)

*Primary Examiner* — Nicholas P Celani
*Assistant Examiner* — Karina J Garcia-Ching
(74) *Attorney, Agent, or Firm* — Chris Kolefas

(57) ABSTRACT

The present technology relates to an information processing device, an information processing method, and a program that can ensure content-related application programs can be reliably utilized. A client 11 reproduces content distributed from a content server 12 via a network 21, and if the content being reproduced is identified by an ACR server 13, a T/SS for managing an application relating to the identified content is acquired from a T/SS server 14, a predetermined application distributed from an application server 15 is acquired on the basis of the T/SS acquired, and the activation and so on of that application is managed, and the application can therefore be reliably utilized. The present technology can, for example, be applied to a content distribution system that distributes content and content-linked applications.

19 Claims, 10 Drawing Sheets

(51) Int. Cl.
  *H04N 21/462* (2011.01)
  *H04N 21/8545* (2011.01)
  *H04N 21/81* (2011.01)
  *H04L 67/10* (2022.01)

(58) Field of Classification Search
  CPC ........... H04N 21/8545; H04N 21/4622; H04N 21/8173; H04N 21/8126; H04N 21/23418; H04N 21/4722
  USPC .................... 709/203, 217, 232; 725/105
  See application file for complete search history.

(56) References Cited

U.S. PATENT DOCUMENTS

| | | |
|---|---|---|
| 2007/0022437 A1 | 1/2007 | Gerken |
| 2007/0053658 A1* | 3/2007 | Murakami ........... G11B 27/105 386/248 |
| 2007/0234213 A1 | 10/2007 | Krikorian et al. |
| 2008/0077965 A1* | 3/2008 | Kamimaki et al. ............ 725/105 |
| 2008/0109876 A1* | 5/2008 | Hitomi ................ H04L 41/0813 726/2 |
| 2008/0162577 A1 | 7/2008 | Fukuda et al. |
| 2008/0189404 A1* | 8/2008 | He ...................... H04L 41/0803 709/223 |
| 2010/0042738 A1* | 2/2010 | Kim ........................ H04L 67/32 709/230 |
| 2010/0138418 A1 | 6/2010 | Youm et al. |
| 2010/0189406 A1* | 7/2010 | Kiyama et al. ................. 386/46 |
| 2010/0215340 A1 | 8/2010 | Pettit et al. |
| 2011/0075990 A1 | 3/2011 | Eyer |
| 2011/0088075 A1 | 4/2011 | Eyer |
| 2011/0243536 A1 | 10/2011 | Eyer |
| 2011/0244784 A1* | 10/2011 | Wang ..................... H04H 60/27 455/2.01 |
| 2011/0246488 A1 | 10/2011 | Eyer |
| 2011/0247028 A1 | 10/2011 | Eyer |
| 2011/0273455 A1* | 11/2011 | Powar .................... G10H 1/368 345/473 |
| 2011/0298981 A1 | 12/2011 | Eyer |
| 2011/0299827 A1 | 12/2011 | Eyer |
| 2011/0302599 A1 | 12/2011 | Eyer |
| 2011/0302611 A1 | 12/2011 | Eyer |
| 2011/0307920 A1 | 12/2011 | Blanchard et al. |
| 2012/0044418 A1 | 2/2012 | Eyer |
| 2012/0047222 A1* | 2/2012 | Freeman ....................... 709/217 |
| 2012/0047531 A1 | 2/2012 | Eyer |
| 2012/0050619 A1 | 3/2012 | Kitazato et al. |
| 2012/0050620 A1 | 3/2012 | Kitazato |
| 2012/0054214 A1 | 3/2012 | Yamagishi et al. |
| 2012/0054235 A1 | 3/2012 | Kitazato et al. |
| 2012/0054267 A1 | 3/2012 | Yamagishi et al. |
| 2012/0054268 A1 | 3/2012 | Yamagishi |
| 2012/0054783 A1 | 3/2012 | Yamagishi |
| 2012/0054784 A1 | 3/2012 | Kitazato et al. |
| 2012/0054816 A1 | 3/2012 | Dewa |
| 2012/0060197 A1 | 3/2012 | Kitahara et al. |
| 2012/0063508 A1 | 3/2012 | Hattori et al. |
| 2012/0072965 A1 | 3/2012 | Dewa |
| 2012/0081508 A1 | 4/2012 | Kitazato |
| 2012/0081607 A1 | 4/2012 | Kitazato |
| 2012/0082266 A1 | 4/2012 | Kitazato et al. |
| 2012/0082440 A1 | 4/2012 | Kitazato |
| 2012/0084802 A1 | 4/2012 | Kitazato |
| 2012/0084824 A1 | 4/2012 | Kitazato |
| 2012/0084829 A1 | 4/2012 | Kitazato |
| 2012/0185888 A1 | 7/2012 | Eyer et al. |
| 2012/0253826 A1 | 10/2012 | Kitazato et al. |
| 2012/0274848 A1 | 11/2012 | Kitahara et al. |
| 2012/0275764 A1 | 11/2012 | Eyer |
| 2013/0007231 A1* | 1/2013 | Forssell ............... H04L 41/0893 709/221 |
| 2013/0024894 A1 | 1/2013 | Eyer |
| 2013/0024897 A1 | 1/2013 | Eyer |
| 2013/0031569 A1 | 1/2013 | Eyer |
| 2013/0036440 A1 | 2/2013 | Eyer |
| 2013/0055313 A1 | 2/2013 | Eyer |
| 2013/0103716 A1 | 4/2013 | Yamagishi |
| 2013/0145414 A1 | 6/2013 | Yamagishi |
| 2013/0167171 A1 | 6/2013 | Kitazato et al. |
| 2013/0191860 A1 | 7/2013 | Kitazato et al. |
| 2013/0198768 A1 | 8/2013 | Kitazato |
| 2013/0201399 A1 | 8/2013 | Kitazato et al. |
| 2013/0205327 A1 | 8/2013 | Eyer |
| 2013/0212634 A1 | 8/2013 | Kitazato |
| 2013/0215327 A1 | 8/2013 | Kitazato et al. |
| 2013/0250173 A1 | 9/2013 | Eyer |
| 2013/0254824 A1 | 9/2013 | Eyer |
| 2013/0258191 A1 | 10/2013 | Eyer |
| 2013/0282870 A1 | 10/2013 | Dewa et al. |
| 2013/0283311 A1 | 10/2013 | Eyer |

FOREIGN PATENT DOCUMENTS

| | | |
|---|---|---|
| CN | 101777363 | 7/2010 |
| EP | 1 843 349 A1 | 10/2007 |
| JP | 2006-050237 | 2/2006 |
| JP | 2006-50237 A | 2/2006 |
| JP | 2008-166914 | 7/2008 |
| JP | 2008-166914 A | 7/2008 |
| JP | 2010-004498 | 1/2010 |
| JP | 2010-4498 A | 1/2010 |
| JP | 2010-166335 | 7/2010 |
| JP | 2010-166335 A | 7/2010 |
| RU | 2328087 | 6/2008 |
| WO | WO 2006/024964 A2 | 3/2006 |

OTHER PUBLICATIONS

Office Action dated Aug. 25, 2016 in Chinese Patent Application No. 201280008259.7 (with English language translation.).
Office Action dated Sep. 8, 2017 in corresponding European Patent Application No. 12 746 987.2, 5 pages.
Office Action dated Jun. 12, 2014 in Japanese Patent Application No. 2011-030058.

* cited by examiner

INFORMATION PROCESSING DEVICE, INFORMATION PROCESSING METHOD, AND PROGRAM

CROSS-REFERENCE TO RELATED APPLICATIONS

This application is a continuation of U.S. Ser. No. 13/996,163, filed Jun. 20, 2013, the entire content of which is incorporated herein by reference, which is a national phase entry under 35 U.S.C. § 371 of International Application No. PCT/JP2012/052904 filed Feb. 8, 2012, published on Aug. 23, 2012 as WO 2012/111514 A1, which claims priority from Japanese Patent Application No. JP 2011-030058 filed in the Japanese Patent Office on Feb. 15, 2011.

TECHNICAL FIELD

The present technology relates to an information processing device, an information processing method, and a program, and particularly relates to an information processing device, an information processing method, and a program with which it is ensured that content-related application programs can be reliably utilized.

BACKGROUND ART

In content distribution services, services that distribute content-related application programs have been realized as well as distribution services for content (for example, see Patent Document 1).

CITATION LIST

Patent Document

Patent Document 1: Japanese Patent Application Laid-Open No. 2006-50237

SUMMARY OF THE INVENTION

Problem to be Solved by the Invention

However, if management information for managing a content-related application program cannot be acquired, there is a possibility that it will not be possible to utilize that application program.

The present technology takes this kind of situation into consideration, and ensures that content-related application programs can be reliably utilized.

Solution to Problem

An information processing device according to one aspect of the present technology includes: a content reproduction unit that reproduces content distributed from a content distribution device; a management information acquisition unit that, in the case where the content being reproduced is identified, acquires management information for managing an application program relating to the identified content, from a management information distribution device that distributes the management information; and a management information processing unit that executes processing to manage the application program on the basis of the acquired management information.

The management information is information relating to control of the application program to be executed in conjunction with the content, and the management information processing unit controls the operation of the application program on the basis of the acquired management information.

The information processing device further includes a sample acquisition unit that acquires sample data of video data or audio data of the content, and the content is identified by a content identification device that identifies target content on the basis of the sample data of the video data or the audio data of the content acquired.

The management information processing unit acquires the application program corresponding to a reproduction time of the content, from an application distribution device that distributes the application program.

The information processing device further includes a presentation unit that presents information indicating a recognition rate of the content that is obtained in the identification processing carried out by the content identification device, and the management information processing unit acquires the application program from the application distribution device in the case where acquisition of the application program is instructed from a user in response to the presented recognition rate of the content.

The sample acquisition unit acquires the sample data once again, in response to the recognition rate of the content that is obtained in the identification processing carried out by the content identification device, and the content is identified on the basis of the sample data acquired once again.

The sample acquisition unit alters an extraction region or a sampling frequency of the sample data in the case where the sample data is to be acquired once again.

An information processing method and program of one aspect of the present technology are an information processing method and program that correspond to an information processing device of the aforementioned one aspect of the present technology.

In the information processing device, the information processing method, and the program of the one aspect of the present technology, content distributed from a content distribution device is reproduced, and if the content being reproduced is identified, management information for managing an application program relating to the identified content is acquired from a management information distribution device that distributes the management information, and on the basis of the acquired management information, processing to manage the application program is executed.

Effect of the Invention

According to the one aspect of the present technology, content-related application programs can be reliably utilized.

MODES FOR CARRYING OUT THE INVENTION

Figure 1:
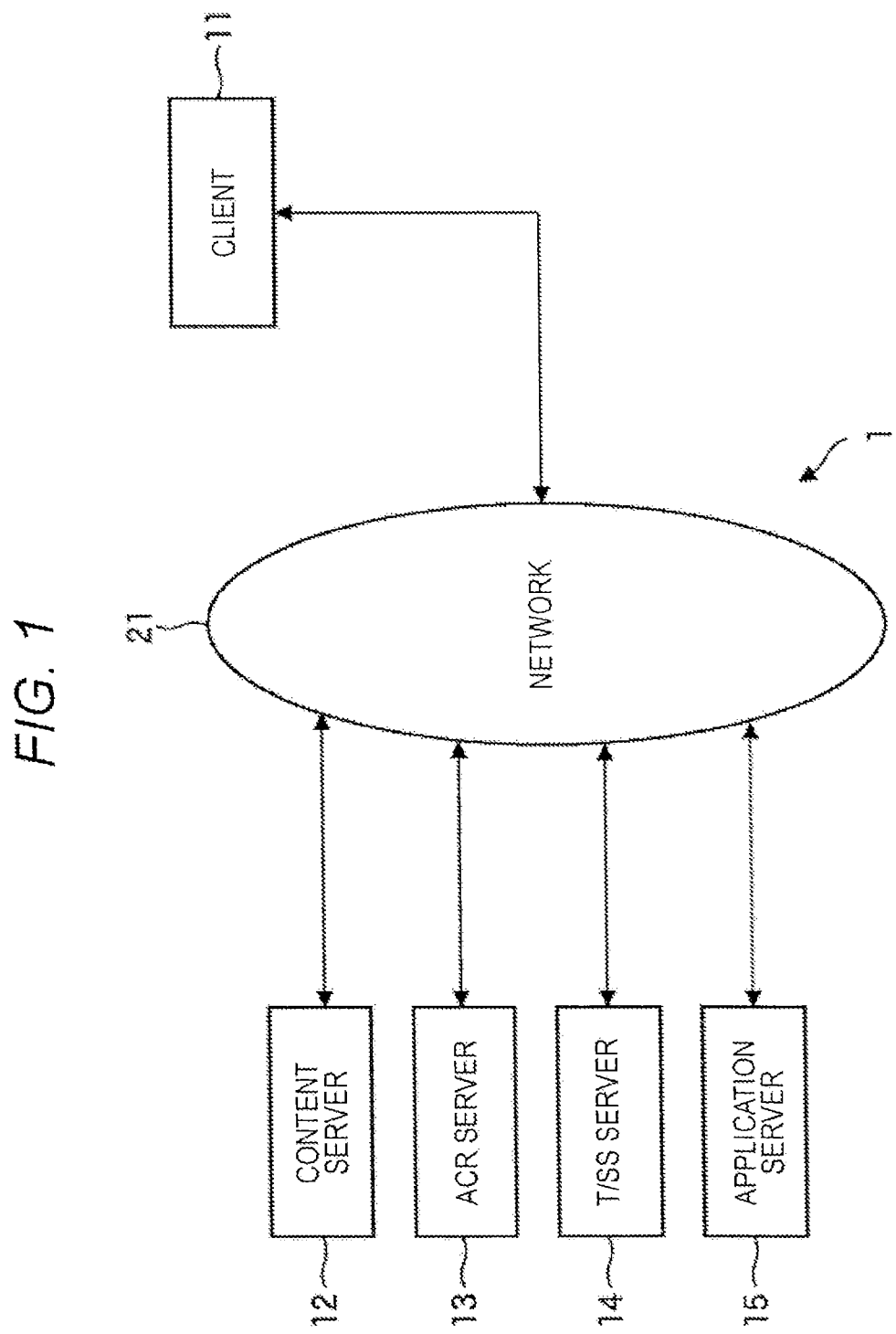
FIG. 1 is a drawing depicting the configuration of a content distribution system.

Embodiments of the present technology are described hereafter with reference to the drawings. It should be noted that the descriptions are given in the following order.
1. First embodiment
2. Second embodiment
3. Third embodiment
4. Modified embodiment 1. First Embodiment Configuration of a Content Distribution System FIG. 1 is a drawing depicting the configuration of a content distribution system.

A content distribution system 1 includes a client 11, a content server 12, an ACR server 13, a T/SS server 14, and an application server 15. The devices from the client 11 to the application server 15 are connected to each other via a network 21 such as the Internet.

The client 11 makes a request, via the network 21, to the content server 12 for the distribution of content.

When the distribution of content is requested from the client 11, the content server 12 distributes, via the network 21, data of predetermined content corresponding to that request.

It should be noted that, as the content distribution method, the data is distributed by unicast (one-to-one) or multicast (one-to-many), either by streaming distribution or download distribution.

The client 11 makes a request, via the network 21, to the ACR server 13 for the identification of the content.

When the identification of content is requested from the client 11, the ACR server 13 executes processing to identify the content being reproduced by the client 11. The ACR server 13 notifies the identification result to the client 11 via the network 21.

Processing referred to as ACR (automatic content recognition) with which target content is identified (specified) on the basis of video data or audio data that make up the content is employed as identification processing for the content, for example. By employing this ACR, it is possible to identify target content that is the same as the content being reproduced in the client 11, on the basis of video data or audio data, without being dependent upon information such as the video resolution, aspect ratio, bit rate, or format.

The client 11 makes a request, via the network 21, to the T/SS server 14 for the distribution of a T/SS.

When the distribution of a T/SS is requested from the client 11, the T/SS server 14 distributes a T/SS corresponding to that request, to the client 11 via the network 21.

Here, T/SS collectively refers to segment sequence information and trigger information proposed as a scheme with which a content-related application program (a content-linked application, hereafter simply referred to as an application) is activated/controlled. In other words, a T/SS can be said to be management information for managing an application to be executed in conjunction with content, and to be information relating to the control of that application. It should be noted that the application may be dependent upon or may not be dependent upon the relative time period from the start of the reproduction of the content (content stream).

The client 11 makes a request, via the network 21, to the application server 15 for the distribution of an application.

When the distribution of an application is requested from the client 11, the application server 15 distributes an application corresponding to that request, to the client 11 via the network 21.

The content distribution system 1 of FIG. 1 is configured as described above.

[Configuration of a Client]

Figure 2:
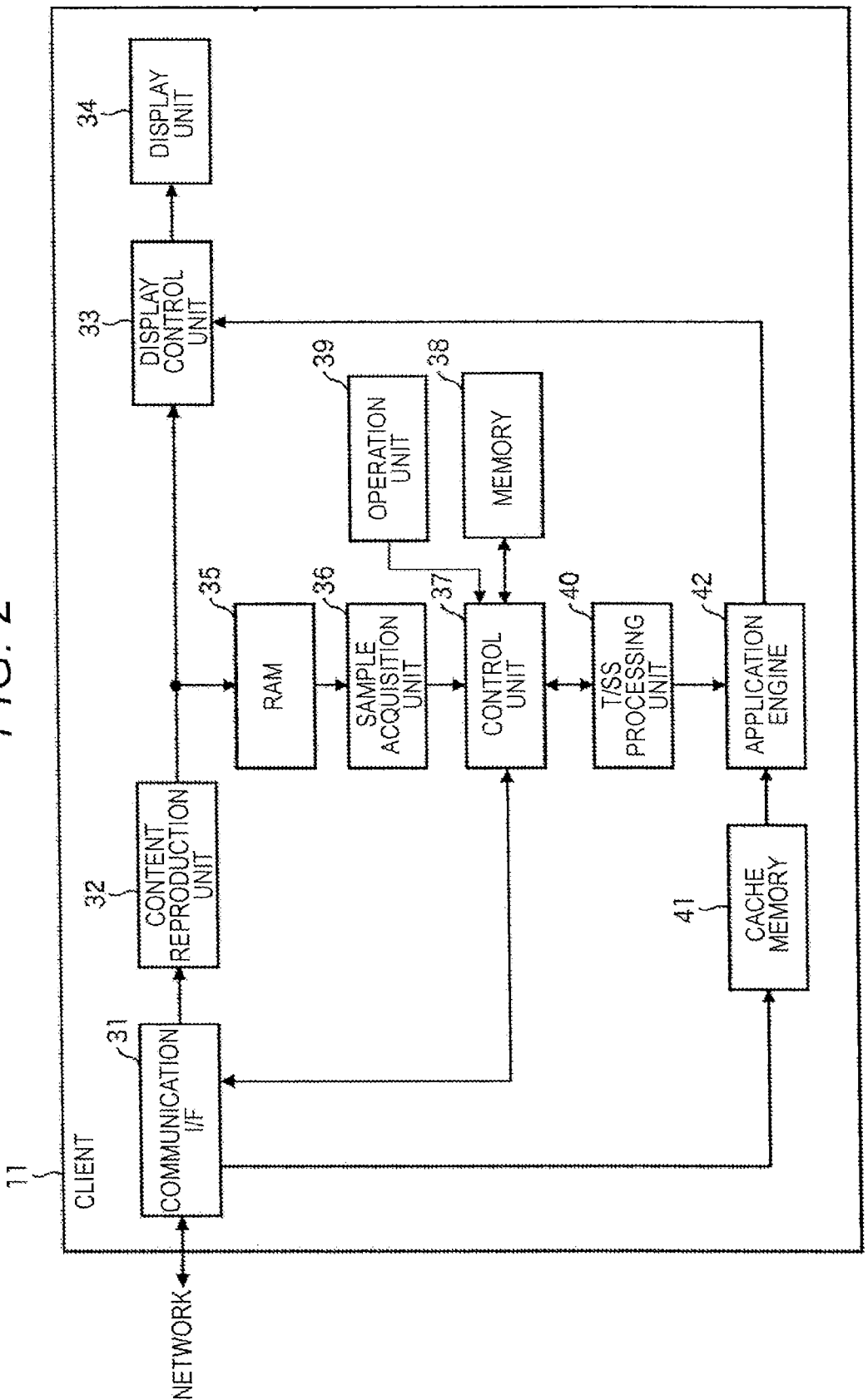
FIG. 2 is a drawing depicting the configuration of a client.

FIG. 2 is a drawing depicting the configuration of the client 11.

The client 11 includes a communication I/F 31, a content reproduction unit 32, a display control unit 33, a display unit 34, a RAM 35, a sample acquisition unit 36, a control unit 37, a memory 38, an operation unit 39, a T/SS processing unit 40, a cache memory 41, and an application engine 42.

The communication I/F 31, in accordance with the control of the control unit 37, connects with the devices from the content server 12 to the application server 15 via the network 21. The communication I/F 31, in accordance with the control of the control unit 37, transmits various types of requests to the devices from the content server 12 to the application server 15 via the network 21.

If content data is received from the content server 12, the communication I/F 31 supplies that content data to the content reproduction unit 32. If an identification result is received from the ACR server 13 or a T/SS is received from the T/SS server 14, the communication I/F 31 supplies that identification result or T/SS to the control unit 37. Furthermore, if an application is received from the application server 15, the communication I/F 31 supplies that application to the cache memory 41.

The content reproduction unit 32 carries out predetermined processing for obtaining video data such as decoding data, with respect to the content data supplied from the communication I/F 31, and supplies the video data thus obtained to the display control unit 33. The display control unit 33 causes the video data supplied from the content reproduction unit 32 to be displayed on the display unit 34. It should be noted that audio data obtained from the content data is supplied to a speaker (not depicted) of a later stage by the content reproduction unit 32.

The RAM 35 temporarily stores the content video data obtained by the content reproduction unit 32. The sample acquisition unit 36 acquires sample data from the content video data stored in the RAM 35, and supplies the sample data to the control unit 37.

The control unit 37 controls the operation of the units of the client 11. A program and data required for the control unit 37 to execute the predetermined processing are temporarily stored in the memory 38. The operation unit 39 receives various types of operations from a user, and supplies signals that correspond to the operations, to the control unit 37.

Furthermore, the control unit 37 controls the communication I/F 31 to transmit, to the ACR server 13, the sampling data supplied from the sample acquisition unit 36, and acquire an identification result from the ACR server 13. The control unit 37 controls the communication I/F 31 to transmit, to the T/SS server 14, a distribution request for a T/SS based on the identification result acquired from the ACR server 13, and acquire a T/SS from the T/SS server 14. The control unit 37 supplies the acquired T/SS to the T/SS processing unit 40.

The T/SS processing unit 40 executes analysis processing for the T/SS supplied from the control unit 37, and, in accordance with that analysis result, executes processing to manage an application such as acquiring, activating, executing, or stopping an application. On the basis of the T/SS, the T/SS processing unit 40 controls the communication I/F 31 by way of the control unit 37, and causes the application received from the application server 15 to be stored in the cache memory 41.

In accordance with the control of the T/SS processing unit 40, the application engine 42 reads and executes the application stored in the cache memory 41. The application engine 42 supplies the application execution result to the display control unit 33. The display control unit 33 causes information corresponding to the application execution result supplied from the application engine 42 to be displayed on the display unit 34.

The client 11 is configured as described above.

[Configuration of a Content Server]

Figure 3:
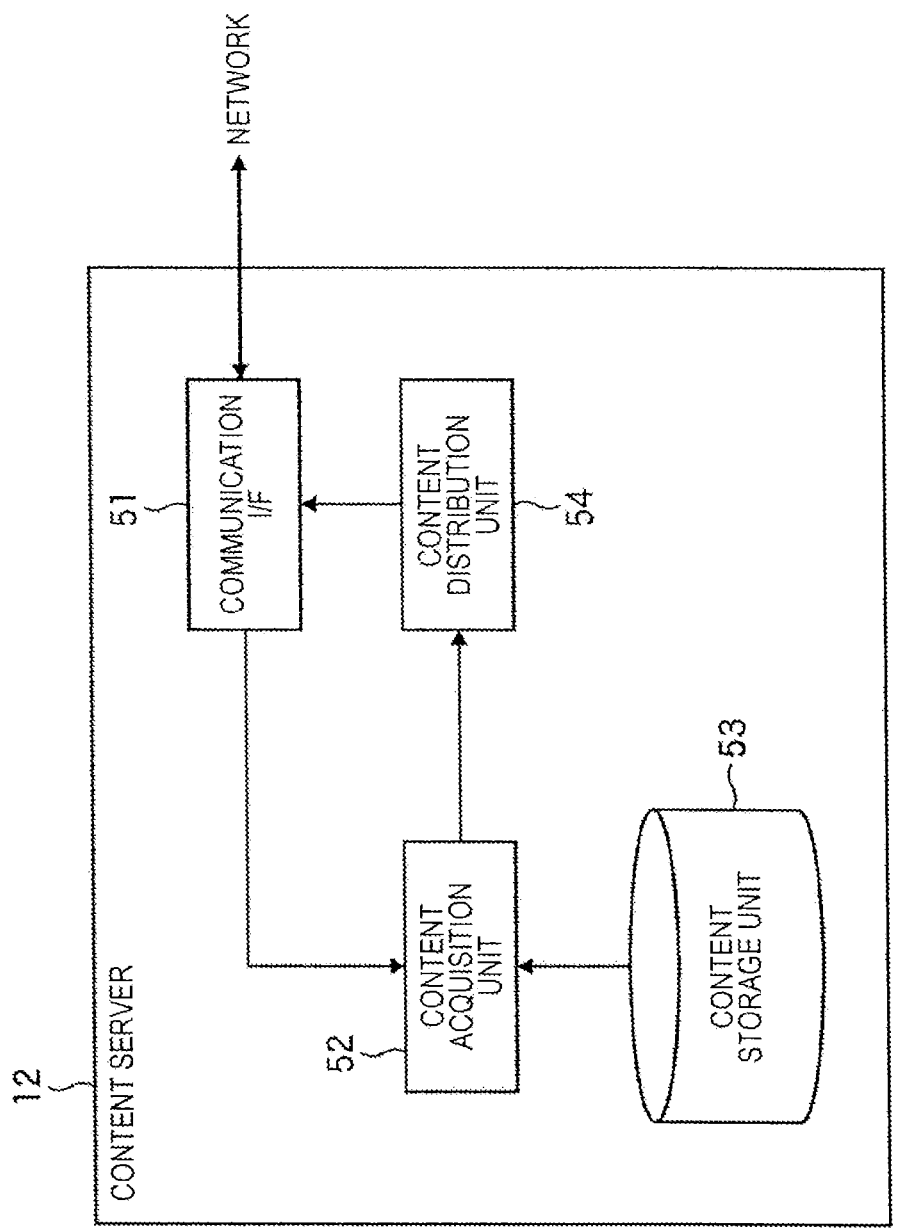
FIG. 3 is a drawing depicting the configuration of a content server.

FIG. 3 is a drawing depicting the configuration of the content server 12.

The content server 12 includes a communication I/F 51, a content acquisition unit 52, a content storage unit 53, and a content distribution unit 54.

The communication I/F 51 connects to the client 11 via the network 21. If the distribution of content is requested from the client 11 via the network 21, the communication I/F 51 supplies the content distribution request to the content acquisition unit 52.

On the basis of the content distribution request supplied from the communication I/F 51, the content acquisition unit 52 acquires, from the content storage unit 53, data of content corresponding to the distribution request, and supplies the data to the content distribution unit 54. Various types of content data such as television programs and movies for example are stored in the content storage unit 53; however, such content data may be acquired from an external device, in addition to that stored in the content storage unit 53.

The content distribution unit 54 controls the communication I/F 51 to distribute the content data supplied from the content acquisition unit 52, to the client 11 via the network 21.

The content server 12 is configured as described above.

[Configuration of an ACR Server]

Figure 4:
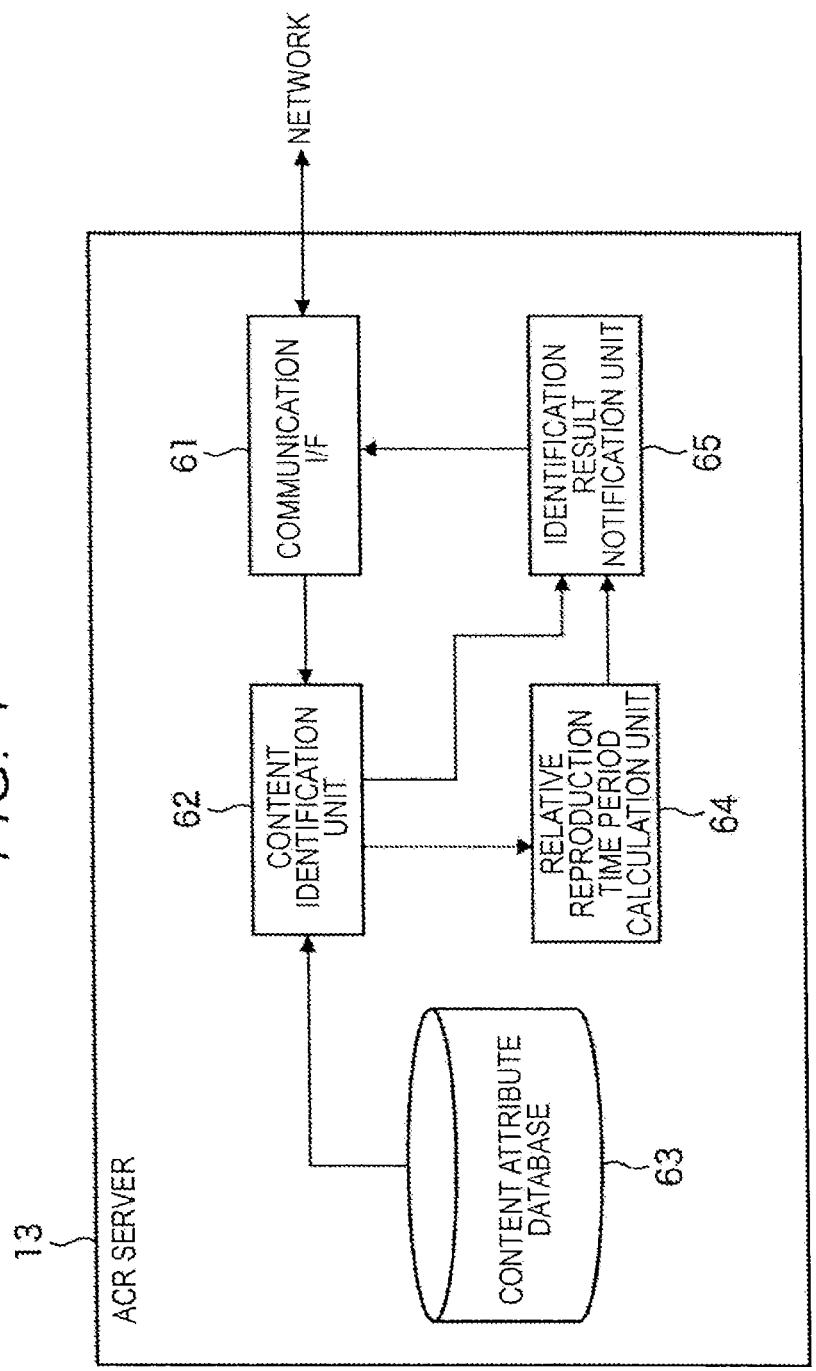
FIG. 4 is a drawing depicting the configuration of an ACR server.

FIG. 4 is a drawing depicting the configuration of the ACR server 13.

The ACR server 13 includes a communication I/F 61, a content identification unit 62, a content attribute database 63, a relative reproduction time period calculation unit 64, and an identification result notification unit 65.

The communication I/F 61 connects to the client 11 via the network 21. If the identification of content is requested from the client 11 via the network 21, the communication I/F 61 supplies the identification request to the content identification unit 62.

The content identification unit 62 executes processing to identify content on the basis of sample data included in the identification request supplied from the communication I/F 61, and attribute data acquired from the content attribute database 63. The content identification unit 62 supplies the identification result to the relative reproduction time period calculation unit 64 and the identification result notification unit 65.

Sample data for identifying original content, and data (attribute data) required in order to execute identification processing such as an identification algorithm are stored in the content attribute database 63. Furthermore, an identifier (a content ID or content URL or the like) is allocated in advance to the original content. It should be noted that the content attribute database 63 may be set up separately from the ACR server 13, and connected from the ACR server 13 via the network 21.

The relative reproduction time period calculation unit 64 calculates a relative reproduction time period (the details of which are described hereafter) on the basis of the identification result supplied from the content identification unit 62, and supplies the relative reproduction time period to the identification result notification unit 65.

The identification result from the content identification unit 62, and the relative reproduction time period from the relative reproduction time period calculation unit 64 are supplied to the identification result notification unit 65. The identification result notification unit 65 controls the communication I/F 61 to notify the identification result including the relative reproduction time period, to the client 11 via the network 21.

The ACR server 13 is configured as described above.

[Configuration of a T/SS Server]

Figure 5:
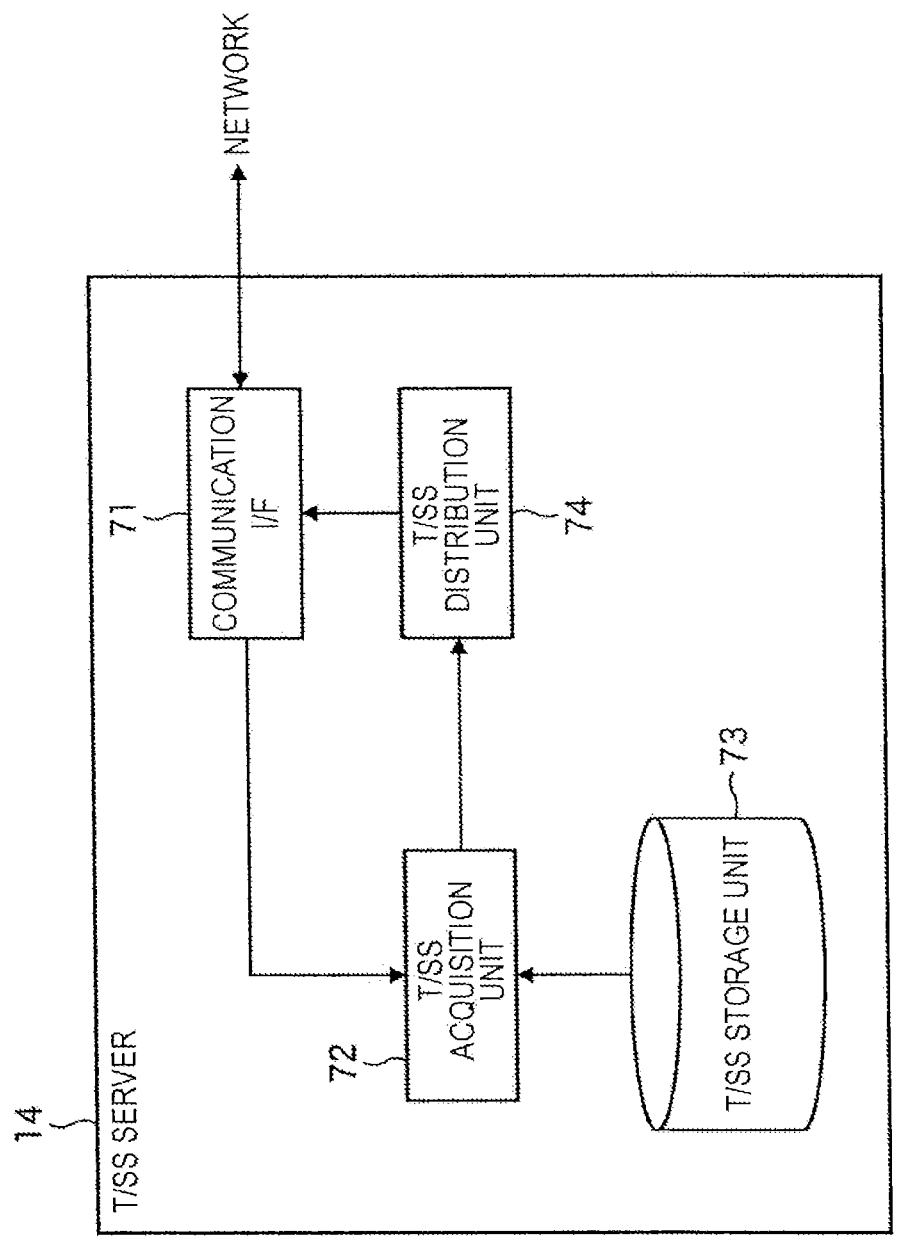
FIG. 5 is a drawing depicting the configuration of a T/SS server.

FIG. 5 is a drawing depicting the configuration of the T/SS server 14.

The T/SS server 14 includes a communication I/F 71, a T/SS acquisition unit 72, a T/SS storage unit 73, and a T/SS distribution unit 74.

The communication I/F 71 connects to the client 11 via the network 21. If the distribution of a T/SS is requested from the client 11 via the network 21, the communication I/F 71 supplies the T/SS distribution request to the T/SS acquisition unit 72.

On the basis of the T/SS distribution request supplied from the communication I/F 71, the T/SS acquisition unit 72 acquires, from the T/SS storage unit 73, a T/SS corresponding to the distribution request, and supplies the T/SS to the T/SS distribution unit 74. Various types of T/SSs for managing content-related applications are stored in the T/SS storage unit 73.

The T/SS distribution unit 74 controls the communication I/F 71 to distribute the T/SS supplied from the T/SS acquisition unit 72, to the client 11 via the network 21.

The T/SS server 14 is configured as described above.

[Configuration of an Application Server]

Figure 6:
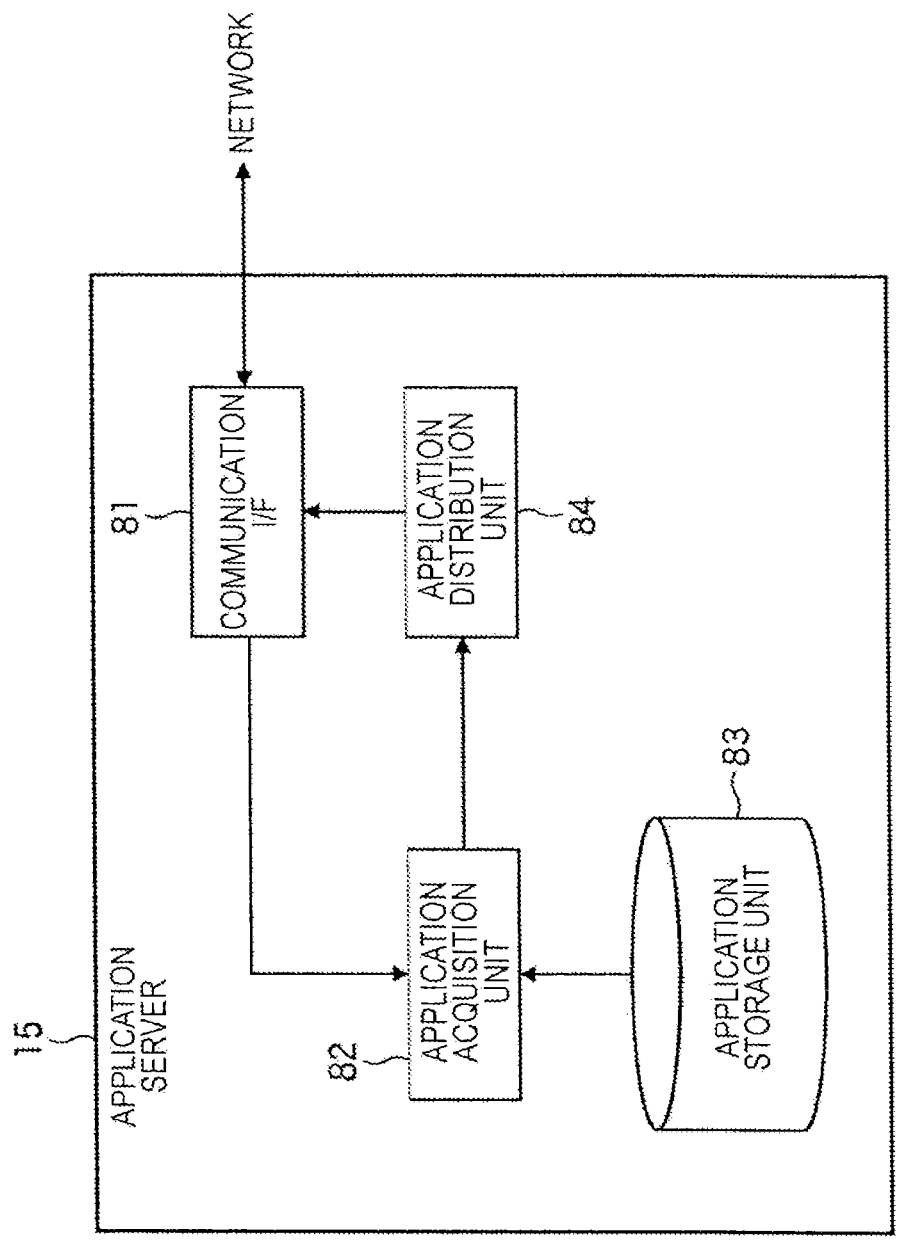
FIG. 6 is a drawing depicting the configuration of an application server.

FIG. 6 is a drawing depicting the configuration of the application server 15.

The application server 15 includes a communication I/F 81, an application acquisition unit 82, an application storage unit 83, and an application distribution unit 84.

The communication I/F 81 connects to the client 11 via the network 21. If the distribution of an application is requested from the client 11 via the network 21, the communication I/F 81 supplies the application distribution request to the application acquisition unit 82.

On the basis of the application distribution request supplied from the communication I/F 81, the application acquisition unit 82 acquires, from the application storage unit 83, an application corresponding to the distribution request, and supplies the application to the application distribution unit 84. Various types of applications related to content are stored in the application storage unit 83.

The application distribution unit 84 controls the communication I/F 81 to distribute the application supplied from the application acquisition unit 82, to the client 11 via the network 21.

The application server 15 is configured as described above.

[Content-Linked Application Distribution Processing]

Next, content-linked application distribution processing that is executed in the content distribution system 1 is explained with reference to the flowchart of FIG. 7.

In the client 11, if reproduction of predetermined content is instructed by way of the operation unit 39 by the user, the control unit 37 controls the communication I/F 31 to transmit a distribution request for content corresponding to a signal from the operation unit 39, to the content server 12 via the network 21 (step S11).

As this distribution request, for example, a request for desired content is made using HTTP protocol, by designating the URL of the desired content from a web browser or a dedicated video reproduction application (player) or the like. Furthermore, for example, a distribution request for desired content may be made by tuning and so on to a multicast distribution channel by means of the URL and so forth of the multicast distribution channel.

If a distribution request is transmitted from the client 11, the distribution request is received in the content server 12 by the communication I/F 51. In step S21, the content acquisition unit 52 acquires, from the content storage unit 53, data of content corresponding to the distribution request.

In step S22, the content distribution unit 54 controls the communication I/F 51 to distribute the content data acquired by the content acquisition unit 52, to the client 11 via the network 21.

When the content is distributed from the content server 12, the content data is received in the client 11 by the communication I/F 31. In step S12, the content reproduction unit 32 reproduces the content data received by the communication I/F 31. Thus, desired content corresponding to the distribution request is displayed on the display unit 34.

In step S13, the sample acquisition unit 36 acquires sample data from video data stored in the RAM 35.

Video data required for the content identification processing executed by the ACR server 13 is acquired as this sample data. For example, with respect to one or more frames of the content being reproduced, video data corresponding to a predetermined region from among the video data of the frames is acquired as sample data. It should be noted that if content identification processing using audio data is handled at the ACR server 13 side, audio data may be acquired as sample data.

In step S14, the control unit 37, for example, causes a PTS (presentation time stamp) of a content stream, or the value of a system clock of the client 11 to be stored in the memory 38 as the time when sample data is acquired (hereafter referred to as the initial reproduction time).

In step S15, the control unit 37 controls the communication I/F 31 to transmit sample data to the ACR server 13 via the network 21, and request the identification of content.

When the identification request is transmitted from the client 11, the identification request is received in the ACR server 13 by the communication I/F 61. In step S31, the content identification unit 62 executes processing to identify content, on the basis of the sample data included in the identification request, and attribute data acquired from the content attribute database 63.

To be specific, the content identification unit 62 acquires an identification algorithm and sample data of the original content as attribute data from the content attribute database 63. The content identification unit 62 executes the identification algorithm, and thereby specifies sample data of the original content that is the same as the sample data (of the content being reproduced) included in the identification request, and identifies the original content recognized as having that sample data included therein. Thus, a content identifier of the content being reproduced is acquired.

In step S32, with respect to the time at which the sample data of the content being reproduced is acquired, the relative reproduction time period calculation unit 64 calculates the relative time period (hereafter referred to as the relative reproduction time period) from the start time of that content. It should be noted that this relative reproduction time period is expressed by means of a PTS or the like.

In step S33, the identification result notification unit 65 controls the communication I/F 61 to notify the content identifier and the relative reproduction time period as an identification result, to the client 11 via the network 21.

When the identification result is notified from the ACR server 13, the content identifier and the relative reproduction time period are received in the client 11 by the communication I/F 31, and are acquired by the control unit 37.

In step S16, the control unit 37 corrects the relative reproduction time period notified from the ACR server 13. As this correction, for example, a correction is carried out based on the difference between the time at which the identification result is notified from the ACR server 13 and the initial reproduction time stored by the processing of step S14, and the relative reproduction time period after the correction (hereafter referred to as the corrected relative reproduction time period) is obtained.

In step S17, the control unit 37 controls the communication I/F 31 to transmit the content identifier and the corrected relative reproduction time to the T/SS server 14 via the network 21, and request the distribution of a T/SS.

When the T/SS distribution request is transmitted from the client 11, the content identifier and the corrected relative reproduction time are received in the T/SS server 14 by the communication I/F 71. In step S41, the T/SS acquisition unit 72 acquires, from the T/SS storage unit 73, a T/SS corresponding to the content identifier and the corrected relative reproduction time.

In step S42, the T/SS distribution unit 74 controls the communication I/F 71 to distribute the T/SS acquired by the T/SS acquisition unit 72, to the client 11 via the network 21.

When the T/SS is distributed from the T/SS server 14, the T/SS is received in the client 11 by the communication I/F 31, and is acquired by the T/SS processing unit 40 by way of the control unit 37. In step S18, the T/SS processing unit 40 executes analysis processing for the T/SS received, and transmits an application distribution request to the application server 15 via the network 21, in accordance with the result of that analysis processing. For example, in the content being reproduced, if there is an application that is to be executed at a certain timing during the reproduction time period of the content, a distribution request for the application described in the T/SS is made to the application server 15 temporally prior to the time at which that application is activated.

When the application distribution request is transmitted from the client 11, the distribution request is received in the application server 15 by the communication I/F 81. In step S51, the application acquisition unit 82 acquires, from the application storage unit 83, an application corresponding to the application distribution request.

In step S52, the application distribution unit 84 controls the communication I/F 81 to distribute the application acquired by the application acquisition unit 82, to the client 11 via the network 21.

When the application is distributed from the application server 15, the application is received in the client 11 by the communication I/F 31, and is stored in the cache memory 41. In step S19, when the activation time of the application is reached, the application engine 42 reads and executes the application stored in the cache memory 41, in accordance with the control of the T/SS processing unit 40. Here, for example, an application for the display of a speedometer that is displayed during the reproduction of automobile race content, or an application for the display of stock price information that is displayed during the reproduction of news content, is executed.

In this way, the T/SS processing unit 40 controls the application engine 42 to execute management such as the acquisition, activation, execution, or stopping of an application, and thereby executes life-cycle management for the application so to speak.

Figure 7:
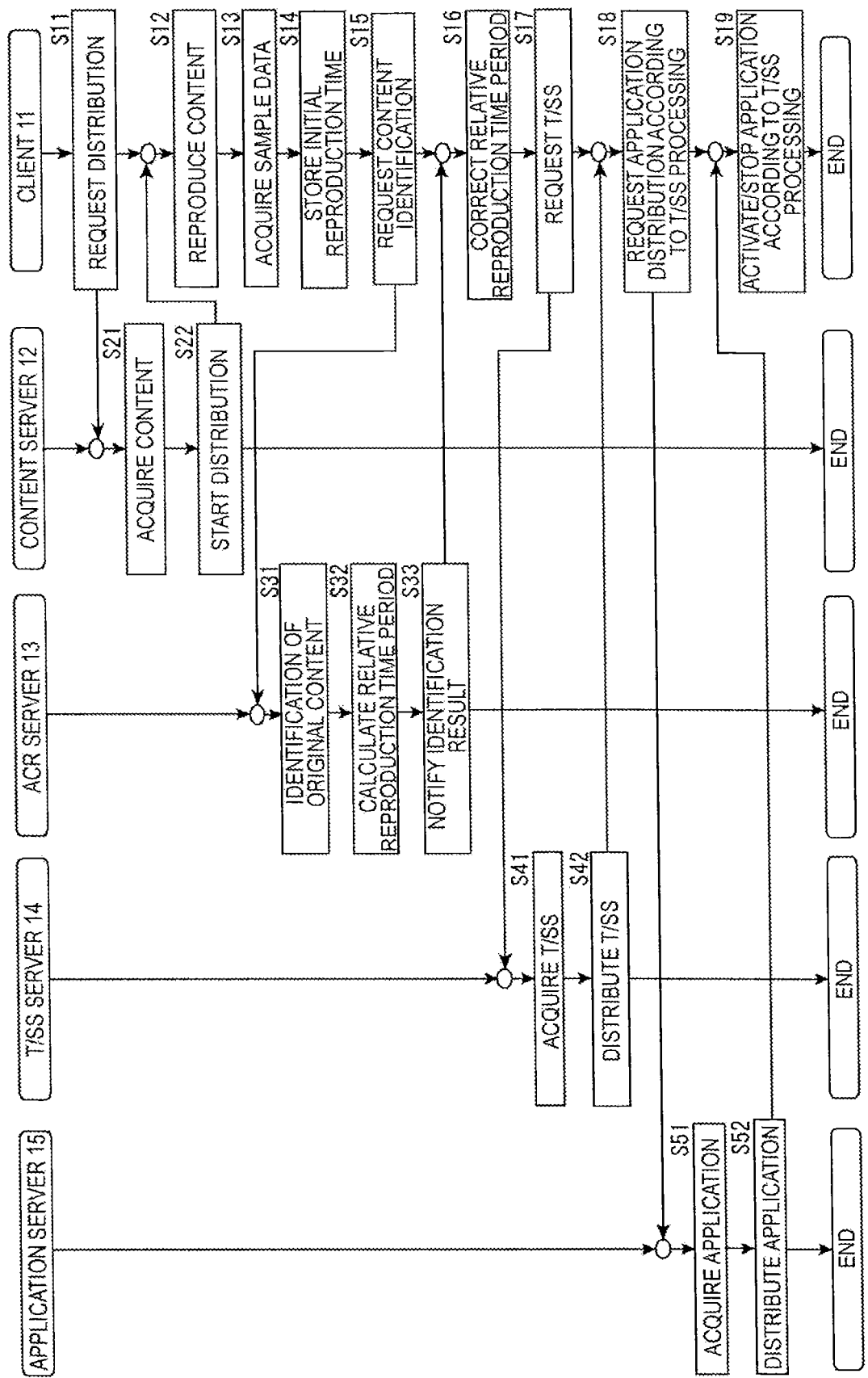
FIG. 7 is a flowchart depicting content-linked application distribution processing.

When the application is stopped thereafter, and in addition the content being reproduced finishes, the content-linked application distribution processing of FIG. 7 finishes.

As described above, in the content distribution system 1, content distributed from the content server 12 is reproduced at the client 11, the T/SS of an application relating to content identified by the ACR server 13 is acquired from the T/SS server 14, and processing is executed by which the application acquired from the application server 15 is managed on the basis of the T/SS acquired. Thus, a content-related application can be reliably utilized.

In other words, if for example the metadata of a content stream is deleted and so on along a distribution path, it will no longer be possible to acquire management information such as a T/SS for managing a content-related application, and it will no longer be possible to execute processing relating to the management information (T/SS) at the client 11 side. It is envisaged that this kind of distribution path is a content distribution chain that continues from a content supplier to a distribution provider and also to a content distribution provider, for example.

Furthermore, it is envisaged that it will no longer be possible for processing relating to the management information (T/SS) to be executed at the client 11 side, and it is also proposed that the management information (T/SS) be stored (inserted during encoding) in an elementary stream of video or audio content. Furthermore, there are cases in which the management information (T/SS) is distributed as the metadata (attachment information/control information of content including a content identifier and so on) of a content stream.

However, at the client 11 side, if it is not possible to acquire management information (T/SS) that is encoded as an elementary stream of content, there is a possibility that the management information (T/SS) cannot be utilized. As this kind of case, for example, a situation is envisaged in which content that has been codec converted and accumulated temporarily at the client 11 side is uploaded to a so-called content sharing site (for example, YouTube).

On the other hand, in the content distribution system 1, the identification of content is executed by the ACR server 13, and the T/SS that is attached to the identified content is acquired from a separate path (in other words, the T/SS server 14 connected to the network 21), and acquisition and activation management of an application is executed on the basis of that T/SS. Therefore, because the T/SS of the content being reproduced is invariably acquired, a content-related application can be reliably utilized.

2. Second Embodiment

Configuration of Another Content Distribution System

Figure 8:
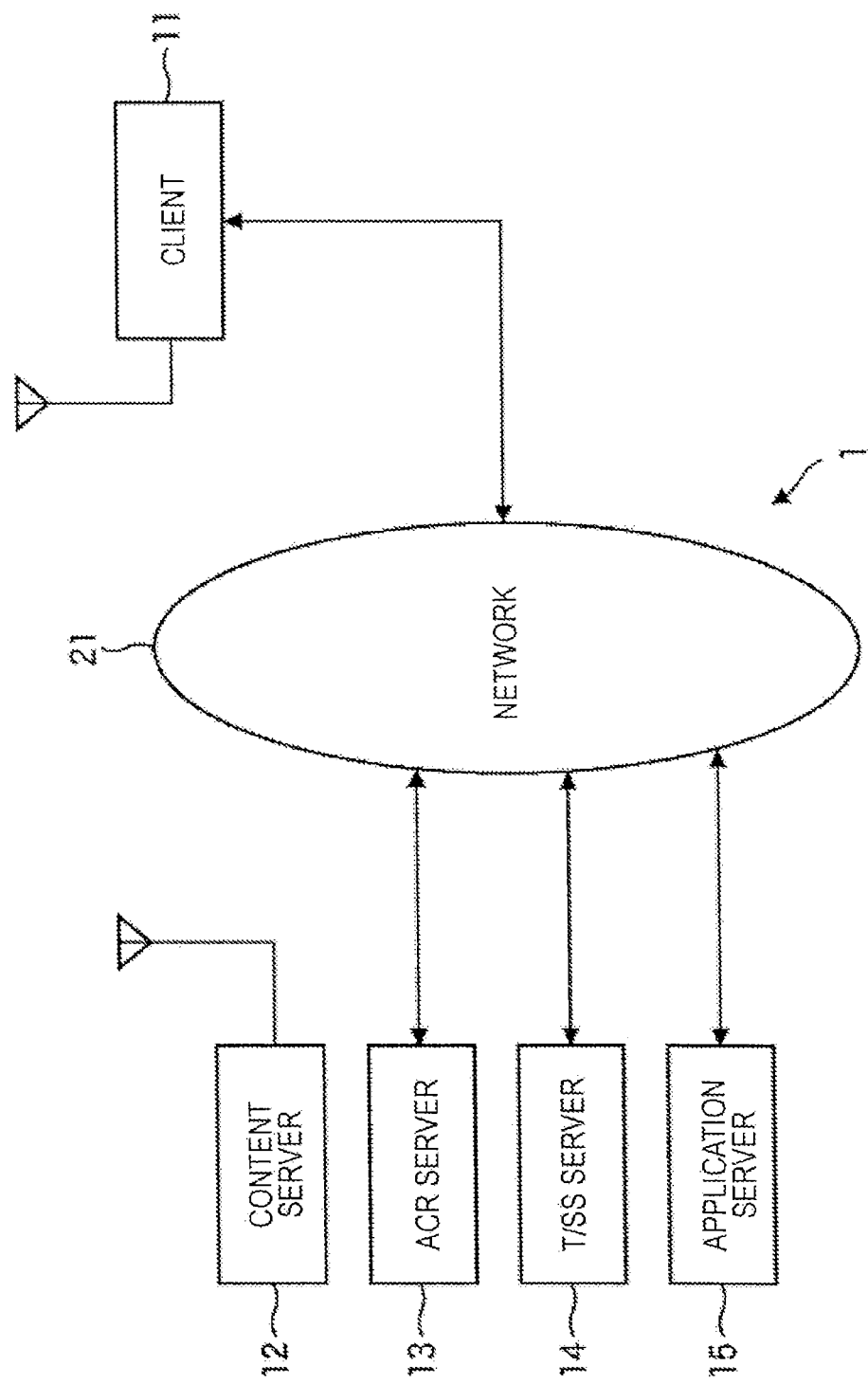
FIG. 8 is a drawing depicting another configuration of a content distribution system.

FIG. 8 is a drawing depicting another configuration of a content distribution system.

In FIG. 1, an example has been described in which the content server 12 distributes content to the client 11 via the network 21 such as the Internet; however, as depicted in FIG. 8, the distribution of the content may be carried out via, for example, a broadcasting network such as terrestrial broadcasting, satellite broadcasting, or cable broadcasting.

In this case, for example, the content server 12 is capable of transmitting a digital television broadcast signal or the like as broadcast content.

On the other hand, the client 11, for example, is a television receiver or a mobile device or the like, and is provided with a block for receiving broadcast content such as a tuner, and broadcast content is received by executing an application for receiving a digital television broadcast for example. Furthermore, for example, broadcast content may be selected by means of a user interface (UI: user interface) on an external set-top box (STB: set-top box) connected to the television receiver.

The client 11 receives and demodulates a digital television broadcast signal transmitted from the content server 12, and decodes a video signal and an audio signal obtained as a result of the demodulation. The client 11 displays a video corresponding to the video data obtained by the decoding, and also outputs, from a speaker, audio corresponding to the audio data.

Furthermore, as depicted in FIG. 8, the client 11 and the devices from the ACR server 13 to the application server 15 are connected via the network 21. As in FIG. 1, the client 11 transmits a variety of requests via the network 21 to the devices from the ACR server 13 to the application server 15, and receives an identification result, a T/SS, or an application in accordance with these requests.

The content distribution system 1 of FIG. 8 is configured as described above.

3. Third Embodiment

Configuration of Another Content Distribution System

Figure 9:
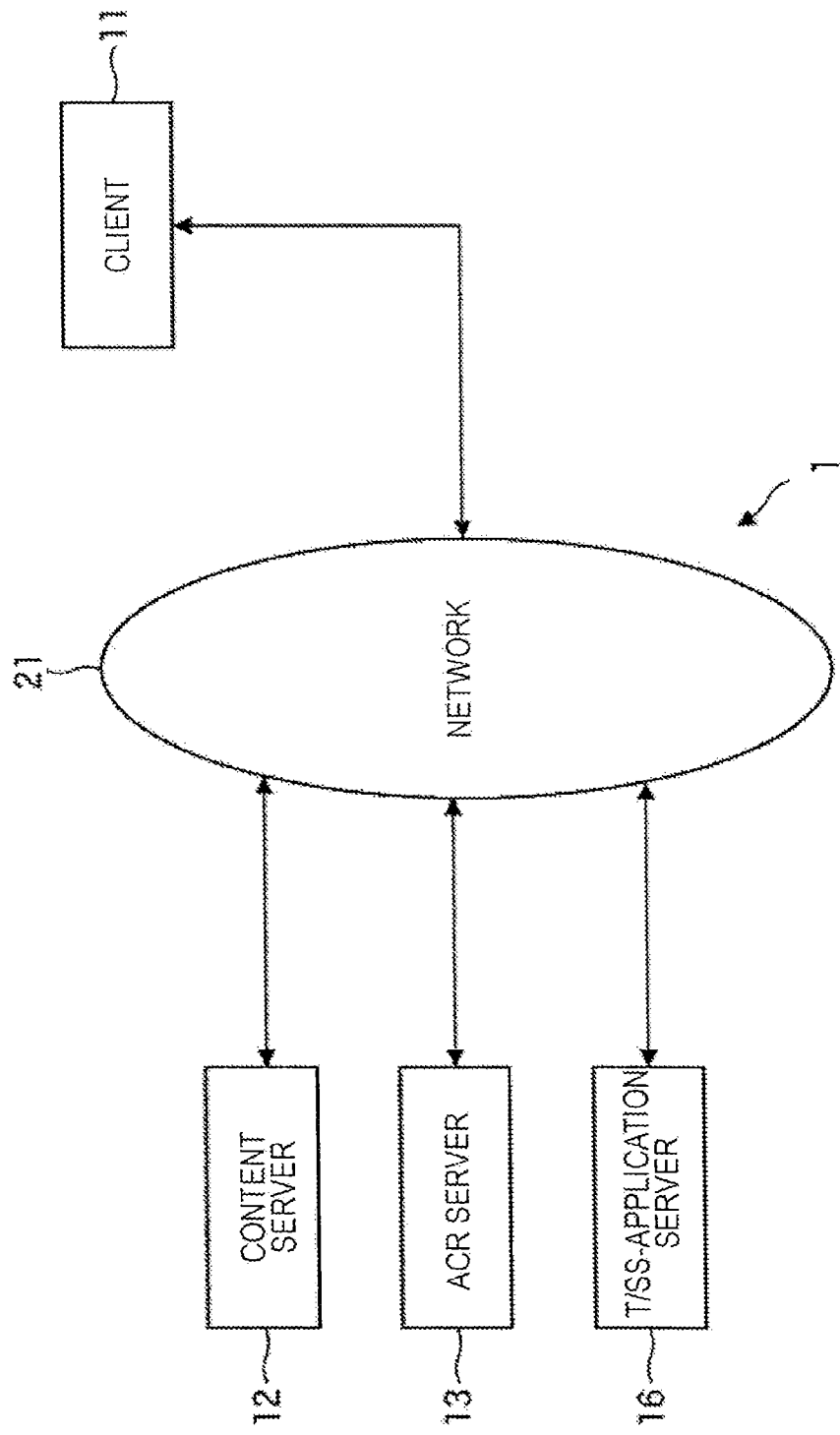
FIG. 9 is a drawing depicting another configuration of a content distribution system.

FIG. 9 is a drawing depicting yet another configuration of a content distribution system.

In FIG. 1, the T/SS server 14 and the application server 15 are both described as being independent devices; however, as depicted in FIG. 9, these devices may be treated as a single T/SS-application server 16.

In other words, the T/SS-application server 16 of FIG. 9 is a single device including a T/SS unit (not depicted) as a single processing unit corresponding to the T/SS server 14 of FIG. 1, and an application unit (not depicted) as a single processing unit corresponding to the application server 15. The T/SS unit includes the devices from the communication I/F 71 to the T/SS distribution unit 74 of FIG. 5, and the application unit includes the devices from the communication I/F 81 to the application distribution unit 84 of FIG. 6.

Similarly, the content server 12 or the ACR server 13 can also be formed as a single unit with another server. In other words, the content server 12, the ACR server 13, the T/SS server 14, and the application server 15 may be independent devices, or may be internal blocks making up a single device. Furthermore, the function (processing to identify content) of the ACR server 13 can be incorporated inside the client 11.

Furthermore, the network 21 means a scheme in which at least two devices are connected and it is ensured that information can be transmitted from a certain device to the other device. Furthermore, the devices that communicate via the network 21 may be independent devices, or may be internal blocks that make up a single device. Here, the communication may obviously be wireless communication and wired communication, or may be communication in which wireless communication and wired communication are mixed, namely when wireless communication is carried out in a certain zone and wired communication is carried out in another zone. In addition, communication from a certain device to another device may be carried out by wired communication, and communication from the other device to the certain device may be carried out by wireless communication.

The content distribution system 1 in FIG. 9 is configured as described above.

4. Modified Embodiment

In the aforementioned descriptions, the client 11 is described as making a request to the ACR server 13 for the identification of content, and making a request to the T/SS server 14 for the distribution of a T/SS corresponding to that identification result; however, the ACR server 13 may distribute the identification result directly to the T/SS server 14 without involving the client 11. In this case, it is possible for the client 11 to receive the distribution of a T/SS from the T/SS server 14 just by making a request to the ACR server 13 for the identification of content.

Furthermore, in the aforementioned description, a description is given with respect to the case in which the identification result of the ACR server 13 is principally distributed to the client 11; however, in addition to this, for example, identification processing may be executed once again in accordance with the identification result produced by the ACR server 13. For example, in the case in which the result of the ACR server 13 executing identification processing has a low recognition rate, the cause of which is a problem in the amount of sample data transmitted from the client 11 side or the sampling frequency, the ACR server 13 may be configured so as to prompt the client 11 to extract new sample data once again and retransmit the new sample data. In this case, at the ACR server 13 side, information relating to the sample data extraction region and sampling frequency can be designated, and the client 11 can be instructed to extract sample data once again. For example, which region of a video is to be extracted is designated as the extraction region, and a sampling cycle is designated as the sampling frequency.

In addition, at the client 11 side, if it is desired that information be acquired regarding whether an identification result has been obtained and at what degree of accuracy an identification result has been obtained in the content identification processing carried out by the ACR server 13, information indicating a recognition rate such as an identification probability or accuracy level may be transmitted in combination with a content identifier, from the ACR server 13 to the client 11. For example, a percent value is used as the identification probability, and an accuracy result of 1-10 grades or levels of high, medium, and low are used as accuracy levels. Furthermore, in the client 11, the result may be presented to the user on the basis of the information indicating the recognition rate, and the decision depending on the recognition accuracy as to whether or not a related application for example is to be acquired may be entrusted to the user. In this case, for example, if the recognition accuracy is low and the user decides not to acquire an application, the distribution of an application is not carried out.

Furthermore, in the aforementioned description, a description is given with regard to the case in which a T/SS distribution request is made only once; however, there are cases in which this distribution request is made a number of times midway through the reproduction of content in the client 11. In addition, T/SSs are distributed by the T/SS server 14, but since T/SSs are normally distributed synchronously together with a certain content stream, only the corresponding T/SS is distributed in accordance with a T/SS distribution request from the client 11; however, there are also cases in which T/SSs subsequent to the relative reproduction time period are collectively distributed. In other words, for example, in a case such as when content that has already been distributed once is temporarily accumulated in a certain terminal, uploaded to a so-called content sharing site, and then viewed by means of the client 11, T/SSs relating to the entirety of the content in question are collectively distributed to the client 11. Furthermore, also in the case in which content is downloaded and distributed and that content is accumulated in the client 11, the T/SSs relating to the entirety of that content may be collectively distributed to the client 11 when the accumulated content is reproduced.

In the aforementioned description, a description is given in which a T/SS serves as an example of management information for managing a content-related application; however, this management information is not restricted to a T/SS, and, for example, may also apply to an AIT (application information table) or the like for controlling a HbbTV (Hybrid Broadcast Broadband Television) browser page. In short, information other than a T/SS is permissible as long as it is information relating to the control of an application.

[Description of a Computer to which the Present Technology has been Applied]

The aforementioned series of processing can be carried out by hardware, and can also be carried out by software. In the case the series of processing is carried out by software, a program constituting that software is installed in a general-purpose computer or the like.

Figure 10:
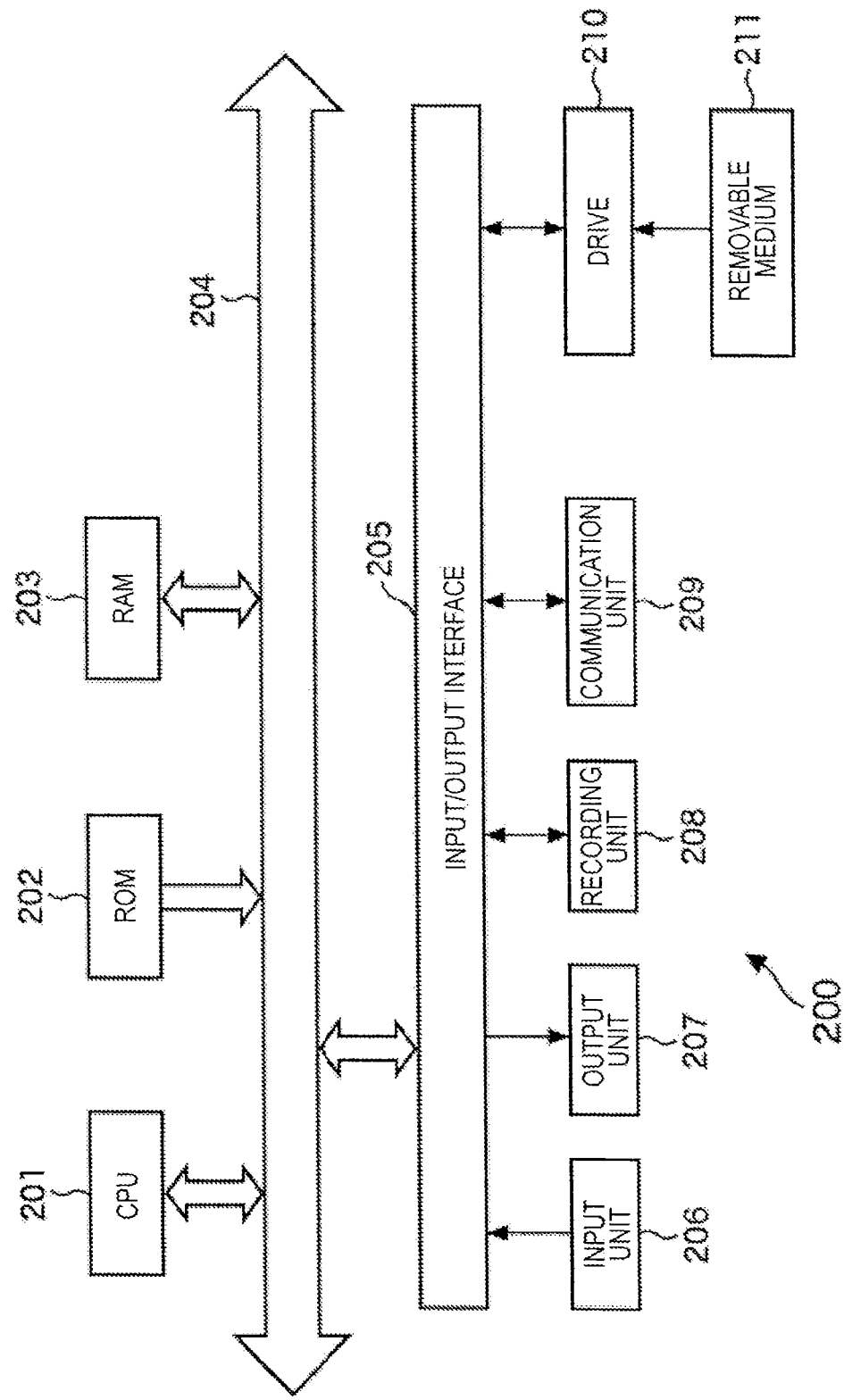
FIG. 10 is a drawing depicting an exemplary configuration of a computer.

FIG. 10 depicts an exemplary configuration of one embodiment of a computer in which a program that executes the aforementioned series of processing is installed.

The program can be recorded in advance in a ROM (read-only memory) 202 or in a recording unit 208 such as a hard disk built into a computer 200.

Alternatively, the program can be temporarily or permanently stored (recorded) on a removable recording medium 211 such as a flexible disk, a CD-ROM (compact disk read-only memory), an MO (magneto-optical) disk, a DVD (digital versatile disk), a magnetic disk, and a semiconductor memory. This kind of removable recording medium 211 can be provided as so-called package software.

It should be noted that apart from installing the program in the computer 200 from a removable recording medium 211 such as the aforementioned, the program can be transferred wirelessly from a download site to the computer 200 via a man-made satellite for digital satellite broadcasting, or transferred by wire to the computer 200 via a network such as a LAN (local area network) and the Internet, and the program which has been transferred in this manner can be received at the computer 200 by a communication unit 209, and installed in the recording unit 208.

The computer 200 is internally equipped with a CPU (central processing unit) 201. An input/output interface 205 is connected to the CPU 201 by way of a bus 204, and when a command is input by way of the input/output interface 205, by an input unit 206 including a keyboard, a mouse, a microphone and the like being operated and so forth by the user, the CPU 201 executes a program stored in the ROM 202, in accordance with the command. Alternatively, furthermore, a program that is stored in the recording unit 208, a program that has been transferred from a satellite or a network and received by the communication unit 209 and installed in the recording unit 208, or a program that has been read from the removable recording medium 211 attached to a drive 210 and installed in the recording unit 208, is loaded into a RAM (random-access memory) 203 and executed by the CPU 201. Thus, the CPU 201 carries out processing according to the aforementioned flowchart, or processing that is carried out in accordance with the configuration of the aforementioned block diagrams. The CPU 201, as required, for example, outputs the processing result thereof by way of the input/output interface 205, from an output unit 207 including an LCD (liquid crystal display) or a speaker and so on, or causes the processing result to be transmitted from the communication unit 209 and, furthermore, recorded, and so on, in the recording unit 208.

Here, in the present description, with regard to the processing steps that describe a program for causing a computer to carry out a variety of processing, processing does not always have to be executed in a time-sequential manner in the order described as the flowchart, and processing that is executed in a parallel or discrete manner (for example, parallel processing or object-based processing) is also included.

Furthermore, with regard to the program, processing may be carried out by one computer, or processing may be carried out in a distributed manner by a plurality of computers. In addition, the program may be transferred to a remote computer and executed.

It should be noted that, in the present description, a system represents the equipment as a whole constituted by a plurality of devices.

In addition, the present embodiments are not restricted to the aforementioned embodiments, and various alterations are possible within a scope that does not deviate from the purpose of the present technology.

REFERENCE SIGNS LIST

1 Content distribution system
11 Client
12 Content server
13 ACR server
14 T/SS server
15 Application server
21 Network
31 Communication I/F
32 Content reproduction unit
33 Display control unit
34 Display unit
35 RAM
36 Sample acquisition unit
37 Control unit
38 Memory
39 Operation unit
40 T/SS processing unit
41 Cache memory
42 Application engine
51 Communication I/F
52 Content acquisition unit
53 Content storage unit
54 Content distribution unit
51 Communication I/F
61 Communication I/F
62 Content identification unit
63 Content attribute database
64 Relative reproduction time period calculation unit
65 Identification result notification unit
71 Communication I/F
72 T/SS acquisition unit
73 T/SS storage unit
74 T/SS distribution unit
81 Communication I/F
82 Application acquisition unit
83 Application storage unit
84 Application distribution unit
200 Computer
201 CPU

The invention claimed is:

1. An information processing device comprising:
reception circuitry configured to receive content via broadcast;
output circuitry configured to output the content using at least one of a display or a speaker; and
circuitry configured to:
process, using a first application, the content for output by the output circuitry;
acquire sample data of video data or audio data from a portion of the content;
transmit the sample data to a first server that determines, based on the sample data, a time point of the content from which the sample data of the video data or the audio data was acquired;
receive response information from the first server, the response information including a content identifier of the content, and time information that indicates the determined time point of the content from which the sample data of the video data or the audio data was acquired;
acquire management information of a second application from a second server based on the response information, wherein the management information of the second application is identified in accordance with the content identifier and the time information, and is acquired from the second server to allow acquisition of the management information when the management information is not received via the broadcast; and
control operation of the second application based on the acquired management information, wherein to control the operation of the second application includes to acquire, activate, execute, or stop the second application based on the management information.

2. The information processing device according to claim 1, wherein the second server is different from the first server.

3. The information processing device according to claim 1, wherein the management information includes a trigger.

4. The information processing device according to claim 1, wherein the circuitry is further configured to:

acquire the second application, from a third server that distributes the second application, based on the management information.

5. The information processing device according to claim 1, wherein to control the operation of the second application includes to acquire the second application using a URL based on the management information.

6. The information processing device according to claim 1, wherein the management information includes a trigger that defines when the second application is to be acquired, activated, executed, or stopped.

7. An information processing method to be performed by an information processing device, the information processing method comprising:
 receiving content via broadcast;
 outputting the content using at least one of a display or a speaker;
 processing, using a first application, the content for output by the output circuitry;
 acquiring sample data of video data or audio data from a portion of the content;
 transmitting the sample data to a first server that determines, based on the sample data, a time point of the content from which the sample data of the video data or the audio data was acquired;
 receiving response information from the first server, the response information including a content identifier of the content, and time information that indicates the determined time point of the content from which the sample data of the video data or the audio data was acquired;
 acquiring, by circuitry of the information processing device, management information of a second application from a second server based on the response information, wherein the management information of the second application is identified in accordance with the content identifier and the time information, and is acquired from the second server to allow acquisition of the management information when the management information is not received via the broadcast; and
 controlling, by the circuitry of the information processing device, operation of the second application based on the acquired management information, wherein controlling the operation of the second application includes acquiring, activating, executing, or stopping the second application based on the management information.

8. The information processing method according to claim 7, wherein the second server is different from the first server.

9. The information processing method according to claim 7, wherein the management information includes a trigger.

10. The information processing method according to claim 7, further comprising:
 acquiring the second application, from a third server that distributes the second application, based on the management information.

11. The information processing method according to claim 7, wherein controlling the operation of the second application includes acquiring the second application using a URL based on the management information.

12. The information processing method according to claim 7, wherein the management information includes a trigger that defines when the second application is to be acquired, activated, executed, or stopped.

13. A non-transitory computer-readable storage medium storing a program which, when executed by a computer, causes the computer to perform an information processing method, the information processing method comprising:
 receiving content via broadcast;
 outputting the content using at least one of a display or a speaker;
 processing, using a first application, the content for output;
 acquiring sample data of video data or audio data from a portion of the content;
 transmitting the sample data to a first server that determines, based on the sample data, a time point of the content from which the sample data of the video data or the audio data was acquired;
 receiving response information from the first server, the response information including a content identifier of the content, and time information that indicates the determined time point of the content from which the sample data of the video data or the audio data was acquired;
 acquiring management information of a second application from a second server based on the response information, wherein the management information of the second application is identified in accordance with the content identifier and the time information, and is acquired from the second server to allow acquisition of the management information when the management information is not received via the broadcast; and
 controlling, by the circuitry of the information processing device, operation of the second application based on the acquired management information, wherein controlling the operation of the second application includes acquiring, activating, executing, or stopping the second application based on the management information.

14. The information processing device according to claim 1, wherein the circuitry is further configured to:
 transmit the sample data of the video data or the audio data of the content to the first server via a network.

15. The information processing device according to claim 1, wherein the circuitry is further configured to:
 acquire the management information from the second server via a network based on the response information received from the first server, and
 acquire the second application from a third server via the network based on the management information.

16. The information processing device according to claim 1, wherein a content distribution device from which the content is received and the first server are different devices.

17. The information processing device according to claim 1, wherein the circuitry is further configured to:
 receive the response information which is transmitted from the first server in response to the sample data, and
 determine whether to acquire the management information based on the received response information.

18. The information processing device according to claim 1, wherein the management information is determined in accordance with a correction of the determined time point of the content from which the sample data of the video data or the audio data was acquired.

19. The information processing device according to claim 18, wherein the correction includes a difference between a time at which the sample data is acquired and a time at which the management information is received.

* * * * *